United States Patent
Chapin

[11] Patent Number: 5,821,413
[45] Date of Patent: Oct. 13, 1998

[54] GRAVITY GRADIOMETRY IN A WELLBORE USING A VIRTUAL LONG-BASELINE

[75] Inventor: David A. Chapin, Plano, Tex.

[73] Assignee: Atlantic Richfield Company, Los Angeles, Calif.

[21] Appl. No.: 835,923

[22] Filed: Apr. 10, 1997

[51] Int. Cl.[6] ........................................ G01V 7/00
[52] U.S. Cl. ........................... 73/152.05; 73/382 G
[58] Field of Search .................... 73/382 G, 382 R, 73/152.05, 152.06, 152.54

[56] References Cited

U.S. PATENT DOCUMENTS

| | | | |
|---|---|---|---|
| 3,668,932 | 6/1972 | Hansen | 73/322 G |
| 3,747,403 | 7/1973 | Yungul | 73/152.05 |
| 4,457,077 | 7/1984 | Lautzenhiser | 33/304 |
| 4,581,932 | 4/1986 | Lautzenhiser et al. | 73/382 |
| 4,602,508 | 7/1986 | Fitch et al. | 73/382 |
| 4,625,547 | 12/1986 | Lyle, Jr. | 73/152 |
| 4,809,545 | 3/1989 | Lyle | 73/151 |
| 5,218,864 | 6/1993 | Pennybaker | 73/152.03 |
| 5,448,912 | 9/1995 | Black | 73/382 G |

*Primary Examiner*—Max H. Noori
*Attorney, Agent, or Firm*—Anderson, Levine & Lintel

[57] ABSTRACT

A method of obtaining gravity gradient well logs over selected baselines, using a well log tool having first and second gravity meters separated by a fixed distance, referred to as the baseline, is disclosed. Gravity gradient measurements are obtained in the wellbore by stepping the tool along the wellbore, where readings at adjacent depths are obtained by setting one of the gravity meters at the same depth at which the other gravity meter is or was located in another reading; alternatively, the well log tool may include a single gravity meter, with readings at adjacent depths made by moving the tool along the wellbore by the baseline. The user or computer system selects a virtual baseline, corresponding to a multiple of the gravity gradient measurements. The gravity gradient is then obtained by summing the individual gravity gradient measurements and dividing by the number of summed measurements. The virtual baseline provides the ability to increase the radius of investigation from that which is provided by the tool itself, and permits selection of varying baselines in deriving the gradient log.

20 Claims, 4 Drawing Sheets

GRAVITY GRADIOMETRY IN A WELLBORE USING A VIRTUAL LONG-BASELINE

BACKGROUND OF THE INVENTION

This invention is in the field of prospecting for oil and gas reservoirs, and is more specifically directed to gravity surveys used in such prospecting.

Many various techniques for determining the presence, location, and attributes of oil and gas reserves in the earth are well known in the art. A direct approach is, of course, to drill exploratory wells to obtain information at multiple depths; the information acquired, however, is limited to the specific locations of the wells. Wider regions of the earth may be prospected through seismic surveys obtained by measuring reflections of acoustic energy from the earth, and by potential field surveys using gravity and geomagnetic measurements at various locations in the earth.

Another well-known approach in hydrocarbon prospecting uses well logs, or measurements made from within a wellbore, to measure and analyze attributes of subsurface strata surrounding the wellbore. Various types of conventional well logs, using different physical mechanisms, are commonly used. For example, well logs may be taken by gamma ray measurements of the natural radioactivity of formations surrounding the wellbore. Another type of well log analyzes formation density by emitting neutrons into the formation and measuring the back-scatter of a radioactive species (neutron or gamma radiation) from the formation. Conventional sonic logs impart sonic energy into the earth and measure the energy reflected from surrounding formations, at multiple locations along the wellbore. Another type of conventional well log measures the electrical conductivity of the surrounding formation to identify whether fluids present in the formation are water or oil. These conventional well log measurements measure (directly or indirectly) properties of the sub-surface formations surrounding the location in the wellbore from which the well log measurements were taken.

Another well-known type of well log measures the gravity field along the wellbore; this approach is referred to in the art as gravimetry. Gravimetric logs are obtained by lowering a borehole gravity tool into and along a wellbore, and by measuring the gravitational field at various depths utilizing a gravity meter deployed within the tool. An example of a conventional borehole gravity meter is the well-known LaCoste and Romberg borehole gravity meter, which is available from Edcon, Inc. in the DEEP DENSITY BHGM sensing element. The measured gravitational field depends both upon the depth of measurement and also upon the density of subsurface formations in the vicinity of the wellbore. As is well known in the art, the gravitational force of the earth increases linearly with increasing depth (the "free air" gradient); however, the measured gravitational force at a particular depth is also reduced by the upward gravitational force applied by the portion of the earth above the gravity tool at that depth (i.e., the "Bouguer effect"). Typically, multiple gravity measurements are used to derive a gravity gradient log, as the rate of change of gravitational force over depth is of greater importance than the absolute values. The difference in gravity measurements between the gravity sensors is then logged as a function of the tool depth, directly producing a gravity gradient log. By separating the free air gradient and the Bouguer effect from the gravity gradient log along a wellbore, one may deduce the presence of subsurface anomalies, such as nearby oil and gas reserves, from the residual gravity measurements. The fundamentals of gravimetry, and gravity gradiometry, are described in Smith, "The Case for Gravity Data from Boreholes", *Geophysics*, Vol. 15, No. 4 (1950), pp. 605–636, and in McCulloh et al., "Application of Gravity Measurements in Wells to Problems of Reservoir Evaluation", presented at the SPWLA Ninth Annual Logging Symposium (1968).

By way of a brief synopsis, gravity gradiometry provides a measurement of the density of a layer of the earth disposed between two measurement locations as will now be described. For example, consider a first gravity measurement $g_1$ taken at a depth $z_1$ in a wellbore, and a second gravity measurement $g_2$ taken at a deeper depth $z_2$ in the same wellbore. The difference between gravity measurements $g_1$, $g_2$ will depend upon the density p of the layer under investigation between depths $z_1$, $z_2$, considering that the gravitational effects of all other layers of the earth will be equal at each of measurement depths $z_1$, $z_2$ at least to a first approximation. The downward gravitational effect of the layer under investigation, as measured at depth $z_1$ (located at the top of the layer), corresponds to:

$$g_1 = 2\pi G \rho \Delta z$$

where $\Delta Z$ is the thickness of the layer under investigation (i.e., the distance $z_2 - z_1$ between measurement depths $z_1$, $z_2$), where G is the Universal gravitational constant, and where ρ is the density of the layer under investigation. Similarly, the gravitational effect of the layer under investigation, as measured at depth $z_2$ (located at the bottom of the layer), corresponds to:

$$g_2 = 2\pi G \rho \Delta z$$

This gravitational effect is upward, as indicated by the minus sign. The gravity difference $\Delta g$, or $g_2 - g_1$, thus corresponds to:

$$\Delta g = g_2 - g_1 = (-2\pi G \rho \Delta z) - (2\pi G \rho \Delta z) = -4\pi G \rho \Delta z$$

One may therefore readily derive the density ρ from the gravity gradient $\Delta g / \Delta z$ as follows:

$$\rho = \frac{-1}{4\pi G} \frac{\Delta g}{\Delta z}$$

As such, gravity gradiometry logs can be readily converted to density logs.

Several important features of gravity gradiometry make this type of well logging particularly attractive in many situations. Firstly, gravity gradiometry provides a direct measurement of the bulk density of formations surrounding a wellbore, and provides such direct measurement without using nuclear or radioactive sources and detectors. This direct density measurement is acquired passively, in that the measurement is based on observations of an existing field, rather than by imparting energy or matter into the surrounding formation. In addition, gravity gradiometry is able to detect the presence of geological anomalies that are some distance away from the wellbore and are therefore invisible to other well log techniques. As such, the range of a gravity gradiometry well log, commonly referred to as the radius of investigation, is an important factor in the usefulness of the log data obtained.

As described in the McCulloh article, the radius of investigation of a gravity gradient log varies with the spacing between adjacent gravity readings; in other words, gravitational effects from subsurface anomalies may be detected at further distances from the wellbore as the sample spacing, or "baseline", increases. Conversely, the effects of near-wellbore anomalies, such as variations in the borehole diameter, the effects of casing and drilling mud, and other wellbore-related factors, become less significant in gradient measurements taken at larger baselines. This relationship may be explained by considering a horizontal stratum of uniform thickness $\Delta Z$, infinite radius, and density $\rho$. As noted above, the gravitational effect $g_{z|R=\infty}$ of the stratum, measured at its upper surface, may be expressed as follows:

$$g_{z|R=2\delta} = 2\pi G \rho \Delta z$$

where G is the gravitational constant. Similarly, the gravitational effect $g_z$ of a right cylinder of uniform thickness $\Delta Z$, density $\rho$, and radius R, measured at a point along the axis of the cylinder and at the upper surface may be expressed as follows:

$$g_z = 2\pi G p [\Delta Z + \sqrt{R^2} - \sqrt{R^2 + \Delta Z^2}]$$

Also as noted above, if the gravitational measurements are made at the bottom surface of the stratum or cylinder, as the case may be, the gravitational field gz exerted by the stratum or cylinder is of the same magnitude, but opposite (i.e., upward) direction. As noted above, one may readily compute the differential gravity $\Delta g_{z|R=\infty}$ measured across a horizontal stratum of uniform thickness $\Delta Z$, infinite radius, and density $\rho$ as follows:

$$\Delta g_{z|R=\infty} = (-2\pi G \rho \Delta z) - (2\pi G \rho \Delta Z) = -4\pi G \rho \Delta z$$

Similarly, the differential gravity $\Delta gz$ measured across a right cylinder of uniform thickness $\Delta Z$, density $\rho$, and radius R may be expressed as:

$$\Delta g_z = 4\pi G p [\Delta Z + \sqrt{R^2} - \sqrt{R^2 + \Delta Z^2}]$$

One may define a radius of investigation $R_i$ as the value of radius R at which the differential gravity $\Delta gz$ equals, for a given differential thickness $\Delta Z$, a specified high fraction (e.g., 90%) of the infinite radius gravitational gradient $\Delta g_{z|R=\infty}$. Conversely, a differential thickness $\Delta Z$ between gravity field measurements defines a radius of investigation $R_i$ beyond which the effects of subsurface anomalies will have insignificant effect upon the measured gravity field gradient.

Referring now to FIG. 1, the effect of measurement spacing upon the radius of investigation of a gravity gradient log, as described in the above-referenced McCulloh et al. article, is illustrated graphically. In the example of FIG. 1, depth points $Z_1$ through $Z_4$ are located at varying spacings, or baselines, along a vertical wellbore WB, and correspond to depth points at which gravity measurements may be made. In this example, depth points $Z_1$, $Z_2$ are located relatively close to one another, separated by a relatively small differential depth, or baseline, $\Delta Z_{21}$; accordingly, a relatively small cylinder $4_A$ is defined by radius of investigation $R_A$, corresponding to the subsurface volume within which geological anomalies can affect a gravitational gradient measurement $g_{z2} - g_{z1}$ (i.e., $\Delta g_{z21}$). Baseline $\Delta Z_{32}$ between measurement depth points $Z_3$, $Z_2$ is somewhat larger than baseline $\Delta Z_{21}$, and gives rise to a larger cylinder $4_B$ defined by radius of investigation $R_B$, within which geological anomalies can be detected by the gravitational gradient measurement $\Delta g_{z32}$. Finally, depth points $Z_3$, $Z_4$ are separated by an even larger baseline $\Delta Z_{43}$, which defines a larger cylinder $4c$ of radius $R_c$, within which geological anomalies can be detected by the gravity gradient between depth points $Z_3$, $Z_4$. Examples of the relative baselines $\Delta Z$ and their corresponding radii of investigation $R_i$, at 90% of the gravity effect, are as follows:

| $\Delta Z$ (feet) | $R_i$ (feet) |
|---|---|
| 30 | 148.5 |
| 50 | 247.5 |
| 100 | 495 |

As evident from the above table, the radius of investigation $R_i$, defined as the location within which 90% of the gravity effect is detectable, is approximately five times the baseline $\Delta Z$ across which the gravity measurements are made.

By way of further background, various publications have recently described relatively new well logging tools, referred to as gravity gradiometers, in which a pair of gravity sensors are deployed at a fixed distance (i.e., the baseline) from one another within a tool to be lowered into a wellbore. The baseline separation between gravity sensors in such tools is on the order of three to thirty feet, which provides a reasonable radius of investigation (up to about 150 feet, as noted in the above table) and ensures that wellbore effects, such as variations in the wellbore diameter, wellbore casing, drilling mud, and the like, will not affect the gravity gradient measurement. Examples of gravity gradiometers are described in International Publication Number WO 96/10759, U.S. Pat. Nos. 4,457,077, 4,581,932, 4,602,508, and 4,809,545.

By way of further background, U.S. Pat. No. 4,625,547 describes a borehole gravity gradiometry method in which gravity measurements are made at varying depths along a borehole. As described therein, particularly at column 3, lines 35 through 40, limitations on the accuracy of contemporary gravity meters require that the separation between measurement stations (i.e., baseline $\Delta Z$) be on the order of ten feet or greater to obtain accurately determine a gravity gradient. This U.S. Pat. No. 4,625,547 discloses a technique by way of which higher resolution (i.e., reduced baseline $\Delta Z$) gravity gradients may be determined by taking measurements at spacings that are less than the separation required for accurate gradient determination using the same gravity meters. According to the disclosed technique, a moving average gradient log is obtained by determining the gravity gradient at locations along the wellbore that are separated from one another by a much smaller depth (e.g., 3 feet) than over which the gradient is determined (e.g., with $\neq Z=15$ feet). Inverse filtering is then applied to the moving average gravity log to deduce gravity gradient values for much smaller baselines (e.g., $\Delta Z=3$ feet) than can be accurately measured in a direct fashion.

By way of still further background, significant advances are being made in the design and construction of gravity gradiometry well log tools, particularly in placing multiple gravity meters within the same well log tool, or sonde, so that a gravity gradient log may be directly obtained. The overall length of the sonde is preferably kept relatively short, especially in deviated wells and other situations in which an excessively long sonde may inhibit its travel along the wellbore. The overall length of the sonde is especially important in very small diameter production tubing, such as tubing having inside diameters of less than two inches. Advances that will permit the inclusion of multiple gravity meters not only include the miniaturization of the meters themselves, but also include the improved sensitivity of modern gravity meters, particularly relative to those described in the above-referenced U.S. Pat. No. 4,625,547 which required the baseline $\Delta Z$ to be on the order of ten feet or greater.

However, as noted above, the measurement of gravity gradients over small baselines correspondingly limits the radius of investigation. Not only does the gravity gradient log become less useful in detecting the presence of geological anomalies with reduced baseline, but wellbore effects (e.g., wellbore diameter variations, casing effects, etc.) also become much more significant factors in the gravity gradient measurements. The benefit of small gravity gradiometry sondes, particularly in small production tubing wellbores, thus comes at the significant price of limiting the geological imaging provided by gravity gradient logs.

It has also been discovered in connection with the present invention that a tradeoff exists, in conventional gravity gradiometry, between deep imaging (i.e., large radius of investigation) and vertical downhole resolution. Typically, according to conventional approaches, the available vertical resolution of the gravity gradiometry log decreases with increasing radius of investigation (i.e., as the image becomes deeper). The above-referenced U.S. Pat. No. 4,625,547 addresses, at most, the ability to increase vertical resolution using relatively long baseline measurements.

BRIEF SUMMARY OF THE INVENTION

The present invention may be implemented into a method of obtaining and analyzing gravity gradiometry well log signals obtained from a short baseline gravity gradiometry log, which may be acquired by way of a short baseline gradiometer tool having first and second gravity meters, or by taking gravity measurements at relatively small separation. The gravity well logs are preferably obtained by advancing the well log tool along the wellbore to obtain short-baseline gravity gradient measurements. According to the present invention, a virtual baseline is selected as a multiple of the short baseline. The gravity gradients measured within the virtual baseline are summed, and the long-baseline gravity gradient over the virtual baseline is determined from the sum of the individual short baseline gradients.

In the case where a short baseline gravity gradiometry tool is utilized, the tool is advanced along the wellbore so that each incremental gravity gradiometry is obtained with one gravity meter at the same depth as that at which the other gravity meter is located when obtaining an adjacent gravity gradient measurement.

DETAILED DESCRIPTION OF THE INVENTION

Figure 1:
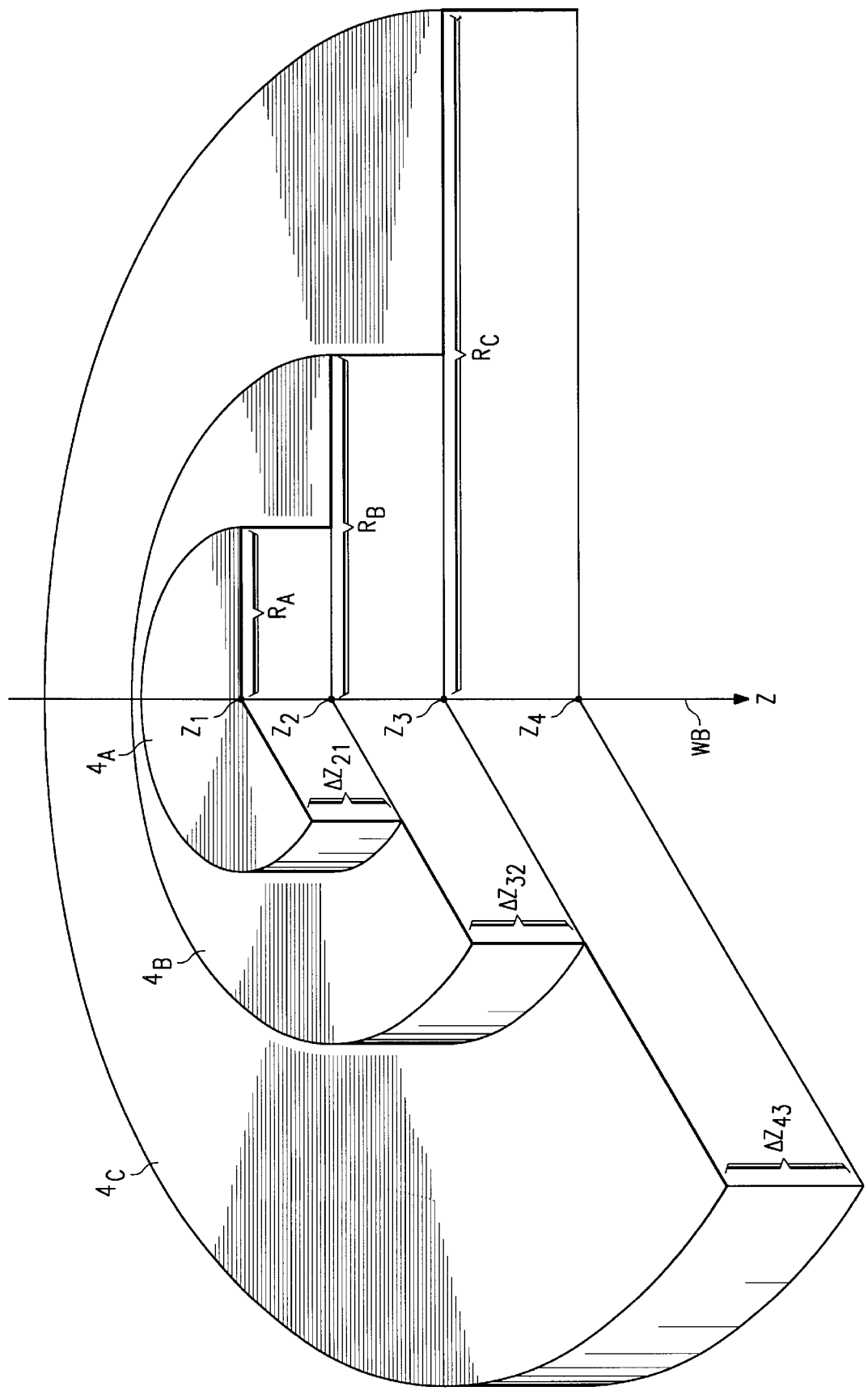
FIG. 1 is a schematic diagram illustrating the known relationship between gravity gradient baseline and radius of investigation.
Figure 2:
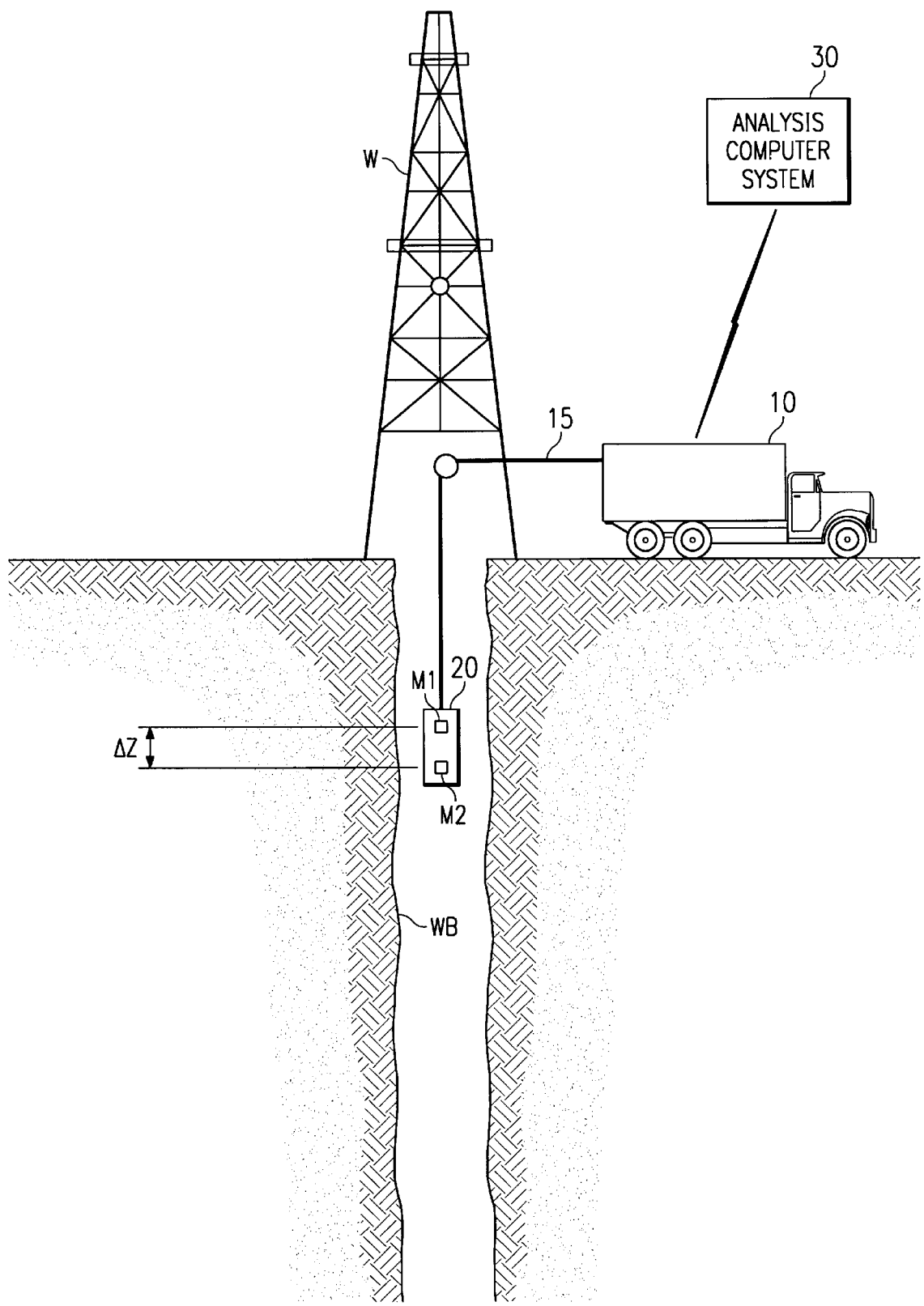
FIG. 2 is a cross-sectional diagram of a gravity gradient well log system according to the preferred embodiment of the invention, as deployed within a wellbore.

Referring now to FIG. 2, a gravity gradiometry well logging operation performed according to the preferred embodiment of the invention will be described in detail. In the example shown in FIG. 2, well logging of wellbore WB at well W is being performed; while wellbore WB is illustrated in FIG. 2 as an uncased wellbore, it is of course to be understood that wellbore WB may alternatively be cased at the time of the logging operation, particularly considering that the type of well logging performed according to the preferred embodiment of the invention is gravity gradiometry. In the land-based survey shown in FIG. 2, recording station 10 is a well logging truck which is connected to sonde 20 by way of wireline 15; in a marine survey, a wireline unit equivalent in function to the truck of FIG. 2 is deployed on the offshore drilling platform to perform the well logging. Sonde 20 is a gravity gradiometry well logging tool with upper gravity meter M1 and lower gravity meter M2 deployed therewithin. Recording station 10 feeds out or retracts wireline 15 to position sonde 20 at the desired depth within wellbore WB in the conventional manner, and receives measurement signals from gravity meters M1, M2 in sonde 20 along wireline 15.

The received signals are recorded by recording station 10, and are communicated thereby to analysis computer system 30, for example by way of wireless communication as suggested by FIG. 2, or simply by transporting disk, tape, or another medium to the location of analysis computer system 30. Alternatively, analysis computer system 30 may be deployed onsite at well W, and in fact may be included within recording station 10 if desired.

As illustrated in FIG. 2 and as described above, sonde 20 includes upper and lower gravity meters M1, M2, respectively, which are vertically separated from one another within wellbore WB when sonde 20 is deployed therewithin. As such, the signals communicated by sonde 20 along wireline 15 to recording station 10 is a signal indicative of the difference in gravitational readings taken by gravity meters M1, M2, and thus relates to a gravity gradient measurement; alternatively, gravity meters M1, M2 may directly communicate relative gravitational measurements to recording station 10, and recording station 10 (or analysis computer system 30, as the case may be) may determine the differential therebetween. The separation between gravity meters Ml, M2, when suspended vertically as shown, is a distance AZ, which is commonly referred to as the "baseline" over which the gravity gradient measurement is made. According to the example of FIG. 2, baseline $\Delta Z$ is fixed for all measurements made using sonde 20 in wellbore WB, as the baseline $\Delta Z$ is determined by the relative locations of gravity meters M1, M2 within sonde 20.

Alternatively, a well log tool with a single gravity meter may be utilized to obtain individual gravity measurements at multiple measurement depths along the wellbore, where adjacent measurement depths are separated by baseline $\Delta Z$. Referring to FIG. 2, according to this alternative approach, the tool would obtain a first gravity measurement by placing the single gravity meter at the depth of meter M1, following which the tool would be lowered by a distance $\Delta Z$ until the single gravity meter was located at the depth of meter M2. The difference in gravity measurements at these two depths would, of course, be used in determining the gravity gradient between the two measurement depths, over baseline $\Delta Z$.

Further in the alternative, well log tools with more than two gravity meters may alternatively be used. In such an implementation, determination of the gravity gradient will of course require proper bookkeeping relative to the depths and gravity meters at which measurements are made.

It is further contemplated that the gravity gradiometry logging operation according to the preferred embodiment of the invention is also applicable to the logging of wellbores that are deviated from the vertical. In such wellbores, the baseline $\Delta Z$ will correspond to the fixed distance between gravity meters M1, M2 in sonde 20 times the cosine of the angle of deviation from the vertical. It is contemplated that the angle of deviation can be readily measured by way of an inclinometer or equivalent measurement apparatus within sonde 20, or by applying corrections to the gravity gradient measurements within recording station 10 or analysis computer system 30, based upon extrinsic measurements of the angle of deviation as a function of position within the wellbore. For clarity, however, the following description will be based on the assumption that wellbore WB is substantially vertical, it being understood that the present invention is also applicable to wellbores that are deviated from the vertical.

Baseline $\Delta Z$ will, of course, depend upon the size of sonde 20. As described in International Publication Number WO 96/10759, gravity gradiometers have been designed with a baseline $\Delta Z$ that is on the order of three feet. In recent years, the use of even shorter baseline gravity gradiometer tools (having a baseline $\Delta Z$ on the order of a few inches) for use in very small wellbores has been proposed, such tools being enabled by advances in the sensitivity of modern gravity meters. While the present invention is applicable to fixed baseline gravity gradiometer tools of either long or short baselines, it is contemplated that the present invention will be especially beneficial when used in conjunction with the shorter baseline tools, preferably with baselines long enough so as avoid near-wellbore noise.

Figure 3:
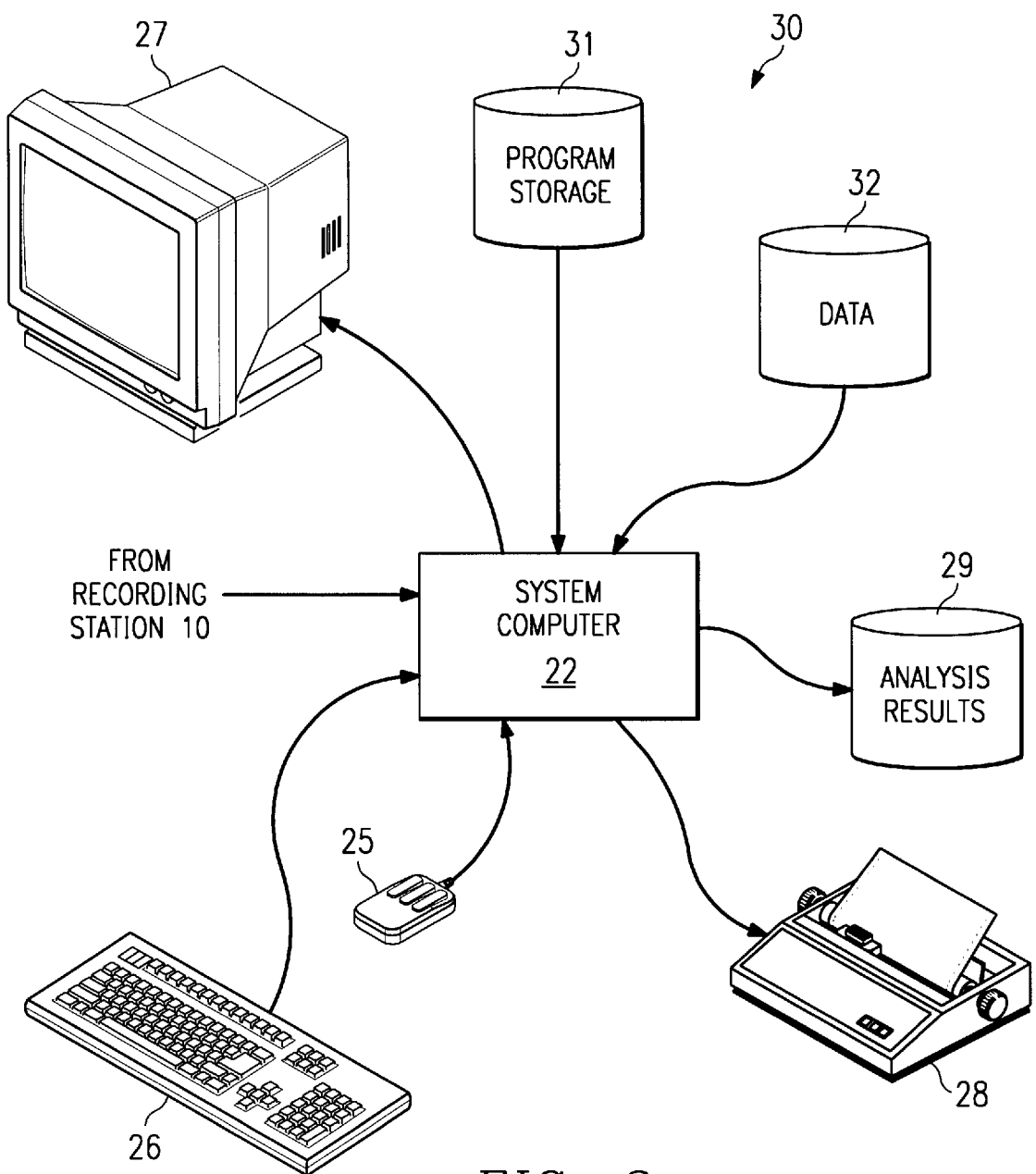
FIG. 3 is an electrical diagram, in block form, of a computer system as used in connection with the preferred embodiment of the invention.

As noted above, recording station 10 is in direct or indirect communication with analysis computer system 30. Referring now to FIG. 3, the construction of analysis computer system 30 according to the preferred embodiment of the present invention, will now be described. This description of analysis computer system 30 is merely an example, as it is to be understood that the present invention may be implemented into a computer system of any suitable architecture, including large mainframe computer systems, distributed computer systems, and the like. It is contemplated that those of ordinary skill in the art will be able to implement the present invention on various arrangements of computer systems.

Analysis computer system 30 includes system computer 22, which may be implemented as any conventional personal computer or workstation, preferably a UNIX-based workstation such as a SPARCstation available from Sun Microsystems, Inc., implemented either in standalone fashion or as part of a network arrangement. System computer 22 is in communication with disk storage devices 29, 31, 32, which are preferably external hard disk storage devices in a network. It is contemplated that disk storage devices 29, 31, 32 are conventional hard disk drives, and as such will be implemented by way of a local area network or by remote access. Of course, while disk storage devices 29, 31, 32, are illustrated as separate devices, a single disk storage device may of course be used to store any and all of the program instructions, measurement data, and results as desired.

In this embodiment of the invention, signals obtained from recording station 10, are received by system computer 22 and stored in digital form on disk storage device 32. System computer 22 can then retrieve the appropriate data from disk storage device 32 to perform the desired analysis, according to program instructions corresponding to the preferred embodiment of the invention as described in detail hereinbelow. For operation on system computer 22, the program instructions are written in the form of computer programs (e.g., in C++ or in any other object-oriented language) stored in computer-readable memory, such as program disk storage device 31 of FIG. 3; of course, the memory medium storing the computer program may be of any conventional type used for the storage of computer programs, including hard disk drives, floppy disks, CD-ROM disks, magnetic tape, and the like.

According to the preferred embodiment of the invention, system computer 22 presents output primarily onto graphics display 27, or alternatively via printer 28; further in the alternative, system computer 22 may store the results of the analysis described hereinbelow on disk storage device 29, for later use and further analysis. Keyboard 26 and pointing device 25 (e.g., a mouse, trackball, or the like) are provided with system computer 22 to enable interactive operation. As noted, system computer 22 is able to communicate with disk storage devices 29, 31, 32, including external hard disk storage on a network and floppy disk drives. As noted above, analysis computer system 30 is typically located at a data center remote from the location of well W, but may alternatively be deployed thereat when desired.

Figure 4:
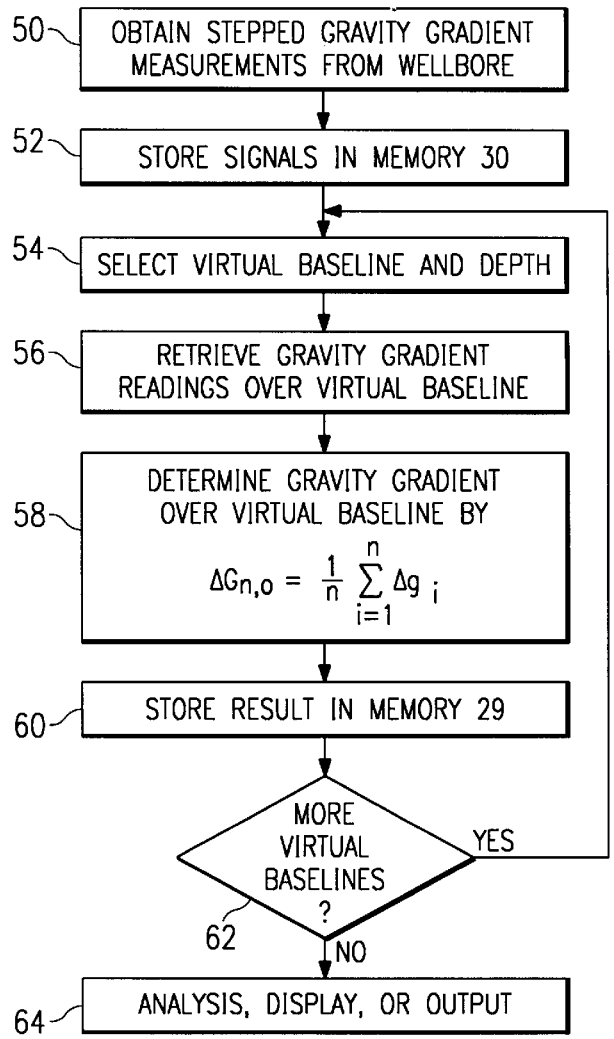
FIG. 4 is a schematic diagram illustrating the gravity gradient measurements obtained in performing the method according to the preferred embodiment of the invention.
Figure 5:
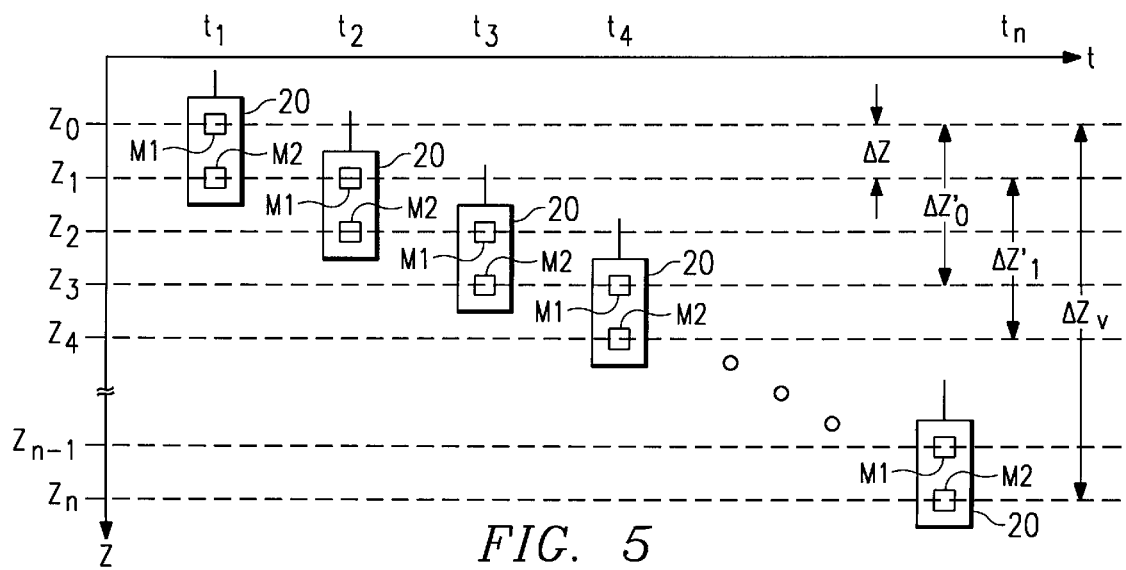
FIG. 5 is a flow chart illustrating the operation of the computer system of FIG. 3 according to the preferred embodiment of the invention.

Referring now to FIGS. 4 and 5, a method of performing a gravity gradient survey according to the preferred embodiment of the invention will now be described. The method of FIG. 4 may be performed by a gravity gradiometry well logging system as illustrated in FIG. 2, in combination with analysis computer system 30 as illustrated in FIG. 3.

As shown in FIG. 4, the method begins with process 50, in which stepped gravity gradient measurements are obtained from within wellbore WB. It is contemplated that the acquisition of stepped gravity gradient measurements performed in process 50 will be required in cases where existing gravity gradiometry logs were not previously obtained with sufficiently small baselines or in a stepped fashion. Alternatively, in the event that properly stepped gravity gradient measurements are available from previous well logs, process 50 may be omitted.

According to the preferred embodiment of the present invention, gravity gradient measurements are obtained in process 50 using a well log tool such as sonde 20 of FIG. 2, in which a pair of gravity meters M1, M2 are separated by a fixed distance (baseline $\Delta Z$), and which provides either a signal corresponding to the difference in gravity field measurements obtained by gravity meters M1, M2, or alternatively provides a pair of signals indicative of the raw gravity measurements from gravity meters M1, M2 (and from which a gravity gradient may be readily determined). The stepped nature of the gravity gradient measurements obtained in process 50 refers to a process by way of which each measurement (after the first) is made by placing sonde 20 at a depth such that one of gravity meters M1, M2 is at the same depth at which the other one of gravity meters M1, M2 is deployed in another measurement.

The obtaining of the stepped gravity gradient measurements in process 50 will now be described in further detail relative to FIG. 5, which is a schematic illustration of the locations at which gravity gradient readings are obtained in wellbore WB with sonde 20 as deployed in the example of FIG. 2. FIG. 5 illustrates a time sequence of discrete readings of gravity gradient by gravity meters M1, M2 in sonde 20 when deployed at varying depths, from shallow to deep. In FIG. 5, the horizontal axis corresponds to time, while the vertical axis corresponds to depth of sonde 20 and gravity meters M1, M2 within vertical wellbore WB.

At time $t_1$, sonde 20 is deployed within wellbore WB at a depth such that upper gravity meter M1 is at depth $Z_0$ and lower gravity meter M2 is at depth $Z_1$. In this example, the separation of gravity meters M1, M2 within sonde 20 is fixed at baseline $\Delta Z$; accordingly, the difference in depth between depths $Z_1$, $Z_0$ is also $\Delta Z$. It is contemplated, as described hereinabove, that baseline $\Delta Z$ is relatively short, for example on the order of three feet or less; such small separation is now possible due to recent advances in gravity meters. Of course, the present invention is equivalently operable for sondes having larger separation between gravity meters deployed therewithin. In any event, at time $t_1$, sonde 20 will return a signal to recording station 10 via wireline 15 corresponding to the gravity gradient $\Delta g_1$ between depths $Z_1$, $Z_0$. Gravity gradient $$\frac{\Delta g_{1,0}}{\Delta Z}$$

will be the difference $\Delta g_1$ between gravity reading $g_1$ at depth $Z_1$ and gravity reading $g_0$ at depth $Z_0$, divided by the separation baseline $\Delta Z$, and corresponds to an estimate of the rate of change of the measured gravity field over depth that may be expressed as follows:

$$\frac{\Delta g_{1,0}}{\Delta Z} = \frac{g_1 - g_0}{\Delta Z}$$

It is contemplated that sonde 20 can readily generate a signal corresponding to the gravity gradient $$\frac{\Delta g_{1,0}}{\Delta Z},$$

considering that the separation baseline $\Delta Z$ between meters M1, M2 is fixed for the tool.

At time $t_2$, sonde 20 is incrementally lowered, or stepped, to a position such that upper gravity meter M1 is at depth $Z_1$, the depth at which lower gravity meter M2 was located for the previous reading at time $t_1$. Lower gravity meter M2 is at depth $Z_2$ at time $t_2$, where depth $Z_2$ is deeper than depth $Z_1$ by baseline $\Delta Z$. Sonde 20 returns a signal to recording station 10 corresponding to gravity gradient $$\frac{\Delta g_{2,1}}{\Delta Z}$$

at depths $Z_2$, $Z_1$ as measured at time $t_2$, where gravity gradient $$\frac{\Delta g_{2,1}}{\Delta Z}$$

is defined similarly as gravity gradient $$\frac{\Delta g_{1,0}}{\Delta Z}$$

described hereinabove.

For successive gravity gradient measurements in successive time intervals, sonde is repetitively lowered, each time by the distance of baseline $\Delta Z$, so that upper gravity meter M1 is at substantially the same depth at which lower gravity meter M2 was for the prior reading. Of course, successive gravity gradient measurements may alternatively be made by incrementally raising sonde 20 by the distance of baseline $\Delta Z$ each time, which provides equivalent readings considering that the time sequence of the gravity gradient readings is unimportant. In the example of FIG. 5, the repetitive lowering and measuring continues until time $t_n$, at which sonde 20 is deployed so that lower gravity meter M2 is at depth $Z_n$ (and upper gravity meter M1 is at depth $Z_{n-1}$). As before, gravity meters M1, M2 in sonde 20 return a signal to recording station 10 that corresponds to the gravity gradient $$\frac{\Delta g_{n,n-1}}{\Delta Z}$$

measured at depths $Z_n$, $Z_{n-1}$.

As discussed above, process 50 may alternatively be performed using a well log tool with a single gravity meter. In this alternative approach, gravity field measurements would be obtained by placing the single gravity meter at each of depths $Z_0$ through $Z_n$ within wellbore WB. Gravity gradients would then be readily calculable by determining the differential gravity between adjacent depths $Z_{i-1}$, $Z_i$ and dividing by baseline $\Delta Z$, to derive a gravity gradient $$\frac{\Delta g_{i,i-1}}{\Delta Z}$$

at those depths.

Referring back to FIG. 5, the overall depth over which gravity gradient measurements $$\frac{\Delta g_{i,i-1}}{\Delta Z}$$

are obtained in process 50 extends from the depth of upper gravity meter M1 at time $t_0$, namely depth $Z_0$, to the depth of lower gravity meter M2 at time $t_0$, namely depth $Z_n$; this overall depth is illustrated in FIG. 5 as virtual baseline $\Delta Z_v$. According to the preferred embodiment of the invention, as will be described in detail hereinbelow, various baselines over which a gravity gradient may be derived are available, extending from the smallest baseline $\Delta Z$ itself (i.e., the separation between gravity meters M1, M2 in sonde 20), and the full depth differential between depth $Z_0$ and depth $Z_n$ (i.e., virtual baseline $\Delta Z_v$), as well as any of the discrete stepped distances therewithin, such as baselines $\Delta Z_0'$, $\Delta Z_1'$, shown in FIG. 4.

Upon the completion of process 50 in which gravity gradient measurements $$\frac{\Delta g_{i,i-1}}{\Delta Z}$$

are obtained in a stepped manner similar as that described relative to FIG. 5, or alternatively in the case where previously obtained stepped gravity gradient well log measurements are available, process 52 is next performed by analysis computer system 30 to store the measurements in its memory, such as disk storage device 32. These measurements are preferably stored in disk storage device 32 in digital form, and in a conventional format for gravity gradiometry well log data.

According to the preferred embodiment of the present invention, as noted hereinabove, any one of a plurality of virtual baselines may be used in determining a gravity gradient between selected ones of the depths used in obtaining the actual gravity gradient measurements in process 50. Process 54 is then performed by system computer 22 in analysis computer system 30, by way of which the user (or an automated function) selects a virtual baseline over which a gravity gradient is desired, as well as the depth associated with the selected virtual baseline.

Referring to FIG. 5, as noted above, the virtual baseline selected in process 54 may be as large as virtual baseline $\Delta Z_v$, which is the distance between the shallowest depth $Z_0$ and the deepest depth $Z_n$ at which measurements are being made. Other smaller virtual baselines may alternatively be selected in process 54. For purposes of clarity, the following description will use the example where the virtual baseline $\Delta Z_v$, extending from depth $Z_0$ to depth $Z_n$, is selected in process 54.

Following process 54, system computer 22 in analysis computer system 30 next performs process 56, in which the gravity gradient readings within the selected virtual baseline at the selected depth, as determined in process 54, are retrieved from memory. In the example where virtual base line $\Delta Z_v$ between depths $Z_0$ and $Z_n$ are selected in process 54, system computer 22 will retrieve the gravity gradient measurements $$\frac{\Delta g_{i,0}}{\Delta Z}, \frac{\Delta g_{2,1}}{\Delta Z}, \ldots, \frac{\Delta g_{i,i-1}}{\Delta Z}, \ldots, \frac{\Delta g_{n,n-1}}{\Delta Z}$$

associated with the selected virtual baseline $\Delta Z_v$ in process 56.

Following retrieval of the gravity gradient measurements $\Delta g_1, \Delta g_1, \Delta g_2, \ldots, \Delta g_n$, system computer 22 next performs process 58 to determine a gravity gradient $\Delta g_v$ over the selected virtual baseline $\Delta Z_v$. This gravity gradient $\Delta g_v$ is determined by system computer 22 by combining the retrieved gravity gradient measurements $\Delta g_1$ through $\Delta g_n$ as will now be described.

As is rudimentary in the art, a gravity gradient $$\frac{\Delta g_{n,0}}{\Delta Z}$$

for the layer in the earth between depths $Z_n$ and $Z_0$ may be directly determined by making specific gravity measurements $g_n$, $g_0$ at those respective depths, divided by the differential depth (baseline) therebetween. In this example, where the differential depth between depths $Z_n$, $Z_0$ corresponds to the selected virtual baseline $\Delta Z_v$, the gravity gradient $$\frac{\Delta g_{n,0}}{\Delta Z_v}$$

could be readily derived in this fashion as follows:

$$\frac{\Delta g_{n,0}}{\Delta Z_v} = \frac{g_n - g_0}{\Delta Z_v}$$

According to the present invention, it was observed that the selected virtual baseline $\Delta Z_v$ equals n times the separation $\Delta Z$ between gravity meters M1, M2 in sonde 20, where n stepped gravity gradient measurements were obtained in process 50. Accordingly, the gravity gradient $$\frac{\Delta g_{n,0}}{\Delta Z_v}$$

may be expressed by:

$$\frac{\Delta g_{n,0}}{\Delta Z_v} = \frac{g_n - g_0}{n\Delta Z}$$

Also according to the present invention, it was also observed that one may express the gravity gradient $$\frac{\Delta g_{n,0}}{\Delta Z_v}$$

as the sum of the individual gravity differences $(g_i - g_{i-1})$ at each time step illustrated in FIG. 5, as follows:

$$\frac{\Delta g_{n,0}}{\Delta Z_v} = \frac{(g_n - g_{n-1}) + (g_{n-1} - g_{n-2}) + \ldots + (g_4 - g_3) + (g_3 - g_2) + (g_2 - g_1) + (g_1 - g_0)}{n\Delta Z}$$

Associating the common denominator $\Delta Z$ with each gravity difference, one may express the gravity gradient $$\frac{\Delta g_{n,0}}{\Delta Z_v}$$

as a summation of the individual gravity gradients $\Delta g_i$ as follows:

$$\frac{\Delta g_{n,0}}{\Delta Z_v} = \frac{1}{n}\left[\frac{g_n - g_{n-1}}{\Delta Z} + \ldots + \frac{g_2 - g_1}{\Delta Z} + \frac{g_1 - g_0}{\Delta Z}\right]$$

$$= \frac{1}{n}\left[\frac{\Delta g_{n,n-1}}{\Delta Z} + \ldots + \frac{\Delta g_{2,1}}{\Delta Z} + \frac{\Delta g_{1,0}}{\Delta Z}\right]$$

$$= \frac{1}{n}\sum_{i=1}^{n}\frac{\Delta g_{i,i-1}}{\Delta Z}$$

where, as described above, an individual gravity gradient $$\frac{\Delta g_{i,i-1}}{\Delta Z}$$

is defined as:

$$\frac{\Delta g_{i,i-1}}{\Delta Z} - \frac{g_i - g_{i-1}}{\Delta Z}$$

Referring back to FIG. 4, therefore, system computer 22 performs process 58 to determine the gravity gradient $$\frac{\Delta g_{n,0}}{\Delta Z_v}$$

over the selected virtual baseline $\Delta Z_v$. Process 58 is performed, according to the above description, by system computer 22 simply summing the retrieved gravity gradients $$\frac{\Delta g_{1,0}}{\Delta Z}$$

through $$\frac{\Delta g_{n,n-1}}{\Delta Z},$$

and dividing the result by the number n of the gradient $$\frac{\Delta g_{i,i-1}}{\Delta Z}$$

so summed. In process 60, the result of process 58, which is gravity gradient $$\frac{\Delta g_{n,0}}{\Delta Z_v},$$

is then stored by system computer 22 in memory (such as analysis results disk storage device 29 of FIG. 3), in association with the virtual baseline $\Delta Z_v$ and the depth (i.e., depths $Z_0$ through $Z_n$) selected in process 54.

It will be apparent from the foregoing description that the virtual baseline $\Delta Z_v$ used in deriving the gravity gradient $$\frac{\Delta g_{n,0}}{\Delta Z_v}$$

is much larger (i.e., n times larger) than the tool baseline $\Delta Z$. Accordingly, as described hereinabove, the radius of investigation associated with the gravity gradient $$\frac{\Delta g_{n,0}}{\Delta Z_v}$$

is also much larger than that associated with the much smaller tool baseline $\Delta Z$. As a result of the preferred embodiment of the invention, therefore, the radius of investigation of a gravity gradient survey is not limited by the small baseline provided by the tool. In the case where a small baseline dual-gravity-meter tool is used to obtain the gravity gradiometry well log, the higher sensitivity readings provided by the tool may thus be used to investigate structures that are located well away from the wellbore, and indeed in such a manner that is unaffected by wellbore effects such as the presence of casing, variations in wellbore diameter, drilling mud effects, and the like.

Upon completion of process 60, decision 61 is then preferably performed by system computer 22 to determine if a gravity gradient is to be performed for the well log over a different virtual baseline, or at a different depth; if so, control passes back to process 54, in which the user selects a new virtual baseline or depth (or both), following which system computer 22 repeats processes 56, 58, 60.

An example of a situation in which additional gravity gradient determinations according to the preferred embodiment of the invention may be performed will now be described, again relative to FIG. 5. In this example, a first gravity gradient $$\frac{\Delta g_{3,0}}{\Delta Z'_0}$$

is determined using virtual baseline $\Delta Z_0'$ between depths $Z_3$, $Z_0$ in a first pass through processes 54, 56, 58. In this first pass, individual gravity gradient measurements $$\frac{\Delta g_{1,0}}{\Delta Z}, \frac{\Delta g_{2,1}}{\Delta Z}, \frac{\Delta g_{3,2}}{\Delta Z}$$

are retrieved from memory such as disk storage device 32, in process 56, and first gravity gradient $\Delta G_{3,0}$ is determined in process 58 as follows:

$$\frac{\Delta g_{3,0}}{\Delta Z'_0} = \frac{1}{3} \sum_{i=1}^{3} \frac{\Delta g_{i,i-1}}{\Delta Z}$$

since virtual baseline $\Delta Z_0'$ corresponds to the three gravity gradient measurements $$\frac{\Delta g_{1,0}}{\Delta Z}, \frac{\Delta g_{2,1}}{\Delta Z}, \frac{\Delta g_{3,2}}{\Delta Z}.$$

In this example, a radius of investigation larger than that provided by sonde 20 itself, but smaller than that of virtual baseline $\Delta Z_v$, is desired.

In this example, a second gravity gradient $$\frac{\Delta g_{4,1}}{\Delta Z'_1}$$

is to be determined over a second virtual baseline $\Delta Z_1'$, between depths $Z_4$ and $Z_1$. As such, decision 61 will return a YES result after the first pass through processes 54, 56, 58, and a second virtual baseline $\Delta Z_1'$ covering the region between depths $Z_4$ and $Z_1$ is selected in the second pass through process 54. In this example, the second virtual baseline $\Delta Z_1'$ is identical in size to the first virtual baseline $\Delta Z_0'$, but is located slightly deeper in the earth. In this second pass, process 56 retrieves gravity gradient measurements $$\frac{\Delta g_{2,1}}{\Delta Z}, \frac{\Delta g_{3,2}}{\Delta Z}, \frac{\Delta g_{4,3}}{\Delta Z}$$

in process 56, and gravity gradient $$\frac{\Delta g_{4,1}}{\Delta Z'_1}$$

is determined in process 58 as follows:

$$\frac{\Delta g_{4,1}}{\Delta Z'_1} = \frac{1}{3} \sum_{i=2}^{4} \frac{\Delta g_{i,i-1}}{\Delta Z}$$

This result is also stored in memory in process 60, as before. Decision 61 is then performed again, to determine if additional baselines or depths are to be considered.

Upon completion of the process for all of the desired baselines (decision 61 is NO), process 62 is then performed by system computer 22 in analysis computer system 30 to analyze, process, or display (or any combination thereof) the results of the gravity gradient determination process. For example, a density log may be displayed on graphics display 27 or plotted on printer 28. A gravity gradient function $$\frac{\Delta g(z)}{\Delta Z_V},$$

which is determined as a function of depth for a selected virtual baseline $\Delta Z_v$ may be readily determined from the above-described process. This gravity gradient function may then be used to derive a density function ρ(z) over depth, according to the relationship:

$$\rho(z) = \frac{-1}{4\pi G} \frac{\Delta g(z)}{\Delta Z_V}$$

Multiple density functions ρ(z) may be generated, using different values of virtual baseline $\Delta Z_v$, to provide "deep density" logs and "shallow density" logs, as desired. Comparison of the deep and shallow density logs can thus provide an indication of the location and properties of interesting geological formations away from the wellbore.

Alternatively, the gravity gradient information for the selected virtual baselines and depths may be used in a survey analysis program, for example to correlate with the results of other types of well logs or seismic surveys. It is contemplated that the gravity gradiometry logs generated according to the preferred embodiment of the invention, particularly where the baseline may be selected or iterated, will be of particular importance in tying well logs to seismic interpretation to improve synthetic seismograms, in providing improved reliability and confidence in porosity measurements, in locating new reserves in older fields in which cased wellbores are already present, in improved monitoring of currently exploited reservoirs such as in mapping gas caps over time therein, and in other known applications in which gravity gradiometry may be used to improve or enhance the understanding of subsurface geological features. It is contemplated that one of ordinary skill in the art will be readily able to insert the results generated by the preferred embodiment of the invention into such analysis.

It will be apparent to those of ordinary skill in the art having reference to the foregoing specification and its drawings that the present invention provides important benefits to the use of gravity gradiometry. Firstly, the present invention provides the user or analyst with the ability to select a virtual gravity gradient baseline that is longer than the baselines provided by dual gravity meter well log tools. The virtual baseline may be selected as any multiple of the tool baseline over which measurements are obtained. As a result, the radius of investigation for the derived gravity gradient may vary widely, and is not limited by the separation between gravity meters within the well log sonde. Gravity gradient logs with large radii of investigation may thus be generated from the small baseline tool logs, not only to investigate the presence of anomalies away from the wellbore but also to avoid wellbore effects in such logs.

Furthermore, the analysis of the gravity different virtual baselines, and repeated instances of the same virtual baseline at varying depths, is facilitated by the present invention. This analysis may be applied to the same measurements as obtained from the dual-gravity-meter tool, without requiring rerunning of the well log itself. Such iterative analysis is contemplated to be of particular benefit in the characterization of subsurface formations, including parameters such as porosity, as desirable in the exploration field.

In addition, the present invention provides the ability to detect, and assist in the analysis of, distant geological formations from the wellbore with improved vertical resolution. The improved vertical resolution results from the short baseline gravity gradient measurements, which may now be used in conjunction with relatively large radii of investigation as provided by the virtual baseline calculations. Accordingly, the depth along the wellbore at which a distant geological formation resides may be determined with a greater degree of accuracy using the present invention.

It is therefore an advantage of the present invention to provide a method of using small baseline gravity gradiometer tools to produce long-baseline gravity gradient measurements.

It is a further advantage of the present invention to provide such a method in which the long-baseline gravity gradient measurements may be obtained with relatively high vertical resolution.

It is a further advantage of the present invention to provide such a method in which the gravity gradient baseline may be selected in data processing, and thus need not affect the spacing of the measurements during the well log procedure.

It is a further advantage of the present invention to provide such a method in which the gravity gradient baseline may be dynamically adjusted to provide gravity gradient logs of varying resolution and radius of investigation from the same well log measurements.

Other advantages of the present invention will be apparent to those of ordinary skill in the art having reference to the above specification together with its drawings.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of obtaining a gravity gradient measurement at a wellbore, comprising the steps of:

obtaining a plurality of gravity measurements at a plurality of measurement depths in the wellbore, wherein adjacent measurement depths differ from one another by a baseline distance;

selecting a first virtual baseline, the first virtual baseline corresponding to a selected multiple of the baseline distance containing a selected number of gravity measurements obtained at adjacent measurement depths;

determining a gravity gradient over the first virtual baseline by summing individual gravity gradients determined from the selected gravity measurements, and by dividing the summed individual gravity gradients by the selected multiple of the baseline distance corresponding to the first virtual baseline; and storing the gravity gradient in computer memory in association with the first virtual baseline.

2. The method of claim 1, wherein the obtaining step comprises:

obtaining a plurality of stepped gravity measurements at varying depths in the wellbore using a well log tool having first and second gravity meters, where the first and second gravity meters are separated in the vertical direction in the wellbore by the baseline distance so that the plurality of stepped gravity measurements are obtained at adjacent measurement depths differing from one another by the baseline distance;

and wherein the first virtual baseline corresponds to a selected number of the stepped gravity measurements.

3. The method of claim 2, wherein the obtaining step comprises:

placing the well log tool into the wellbore, so that the first gravity meter is at a first measurement depth and so that the second gravity meter is at a second measurement depth, the first and second measurement depths differing by the baseline;

recording at least one signal from the first and second gravity meters at the first and second depths, respectively, the recorded signal corresponding to gravity measurements made thereby;

then moving the well log tool within the wellbore so that the first gravity meter is at the second depth and so that the second gravity meter is at a third depth;

recording at least one signal from the first and second gravity meters at the second and third depths, respectively, the recorded signal corresponding to gravity measurements made thereby; and then repeating the moving and recording steps, each moving step moving the well log tool so that the first gravity meter is at the depth at which the second gravity meter was located in the prior recording step.

4. The method of claim 3, wherein the signal recorded in the recording steps corresponds to a differential gravity signal indicating the difference between the gravity measurements made by the first and second gravity meters.

5. The method of claim 3, wherein each of the moving steps moves the well log tool deeper within the wellbore.

6. The method of claim 3, wherein each of the moving steps moves the well log tool shallower within the wellbore.

7. The method of claim 1, wherein the obtaining step comprises:

placing a well log tool having a gravity meter into the wellbore, so that the gravity meter is at a first measurement depth;

recording a signal corresponding to a gravity field measurement from the gravity meter at the first measurement depth;

then moving the well log tool within the wellbore so that the gravity meter is at a second measurement depth that differs from the first measurement depth by the baseline distance;

recording a signal corresponding to a gravity field measurement from the gravity meter at the second measurement depth.

then repeating the moving and recording steps for a plurality of measurement depths.

8. The method of claim 1, wherein the wellbore is a cased wellbore.

9. The method of claim 1, wherein the determining step is performed by a digital computer;

and further comprising:
 after the obtaining step, storing signals corresponding to the plurality of gravity measurements in computer memory; and
 retrieving, from the computer memory, the signals corresponding to the selected adjacent ones of the gravity measurements.

10. The method of claim 1, further comprising:

repeating the selecting and determining steps for a second virtual baseline.

11. The method of claim 10, wherein the second virtual baseline has the same number of gravity measurements as the first virtual baseline, but corresponds to different gravity measurements.

12. The method of claim 10, wherein the second virtual baseline has a different number of gravity measurements from the first virtual baseline.

13. A method of operating a computer to produce a gravity gradient log of a wellbore from a plurality of gravity measurements obtained at varying measurement depths in the wellbore, wherein adjacent measurement depths differ from one another by a baseline distance, comprising the steps of:

storing signals corresponding to the plurality of gravity measurements in computer memory;

selecting a first virtual baseline, the first virtual baseline corresponding to a selected multiple of the baseline distance and containing a selected number of adjacent ones of the stepped gravity measurements;

retrieving, from the computer memory, the signals corresponding to the selected adjacent ones of the gravity measurements;

operating the computer to determine a gravity gradient over the first virtual baseline by summing individual gravity gradients determined from the selected adjacent ones of the gravity measurements, and by dividing the summed individual gravity gradients by the selected multiple of the baseline distance corresponding to the first virtual baseline; and storing the gravity gradient in computer memory in association with the first virtual baseline.

14. The method of claim 13, wherein the gravity measurements are obtained at varying depths in the wellbore using a well log tool having first and second gravity meters, where the first and second gravity meters were separated in the vertical direction in the wellbore by the baseline distance, and wherein the stepped gravity measurements were obtained at depths differing from one another by the baseline distance.

15. The method of claim 14, wherein each of the plurality of gravity measurements is a gravity gradient measurement over the baseline distance.

16. The method of claim 13, further comprising:

repeating the selecting and determining steps for a second virtual baseline.

17. The method of claim 16, wherein the second virtual baseline has the same number of gravity measurements as the first virtual baseline, but corresponds to different gravity measurements.

18. The method of claim 16, wherein the second virtual baseline has a different number of gravity measurements from the first virtual baseline.

19. The method of claim 13, further comprising:

displaying the results of the determining step on a graphics display.

20. The method of claim 13, further comprising:

plotting the results of the determining step using a computer output device.

* * * * *